Aug. 19, 1952     O. NORGORDEN     2,607,915
RADIO BEACON SYSTEM
Filed Aug. 6, 1945     3 Sheets-Sheet 1
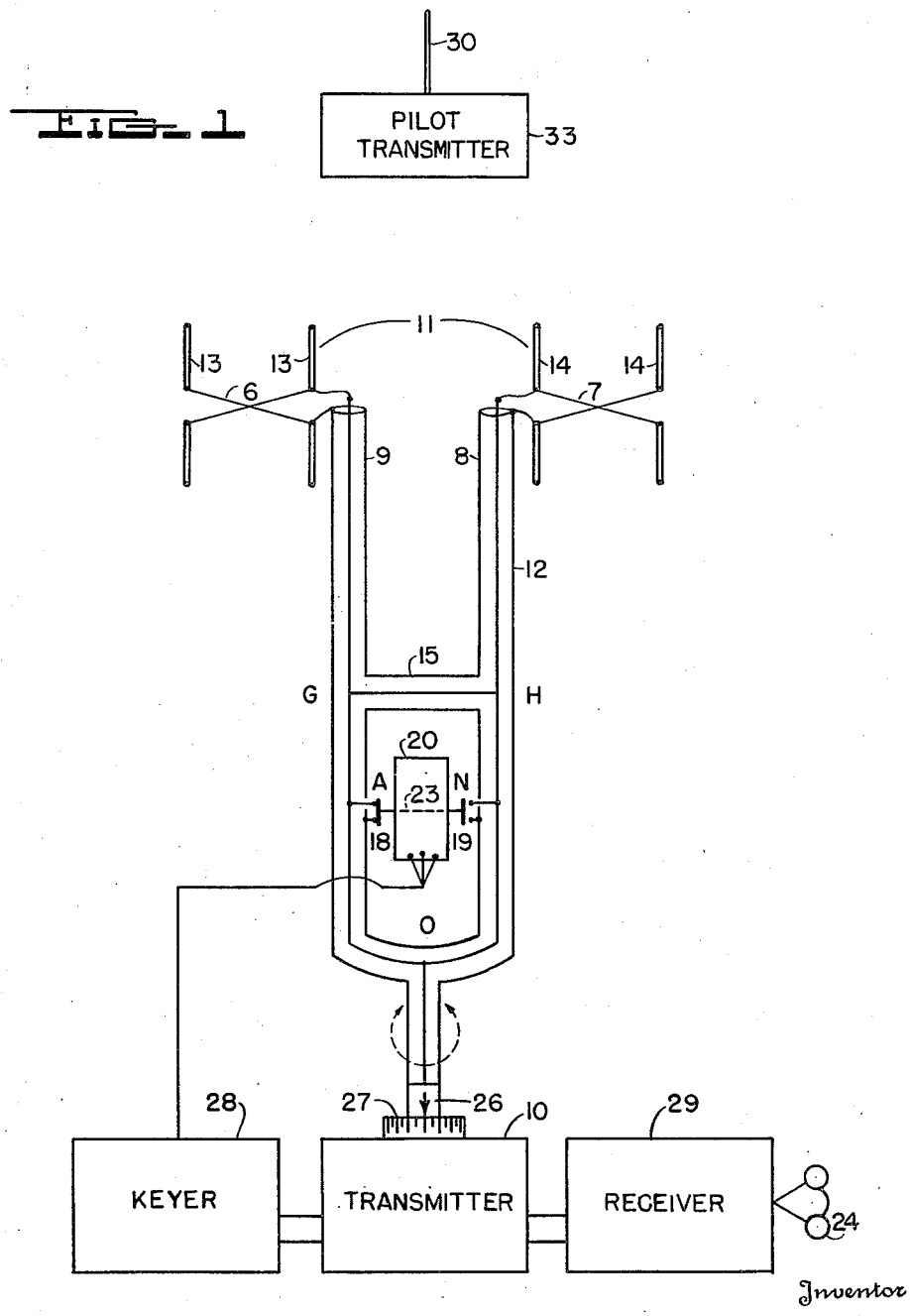
Inventor
OSCAR NORGORDEN
By Ralph L. Chappell
Attorney

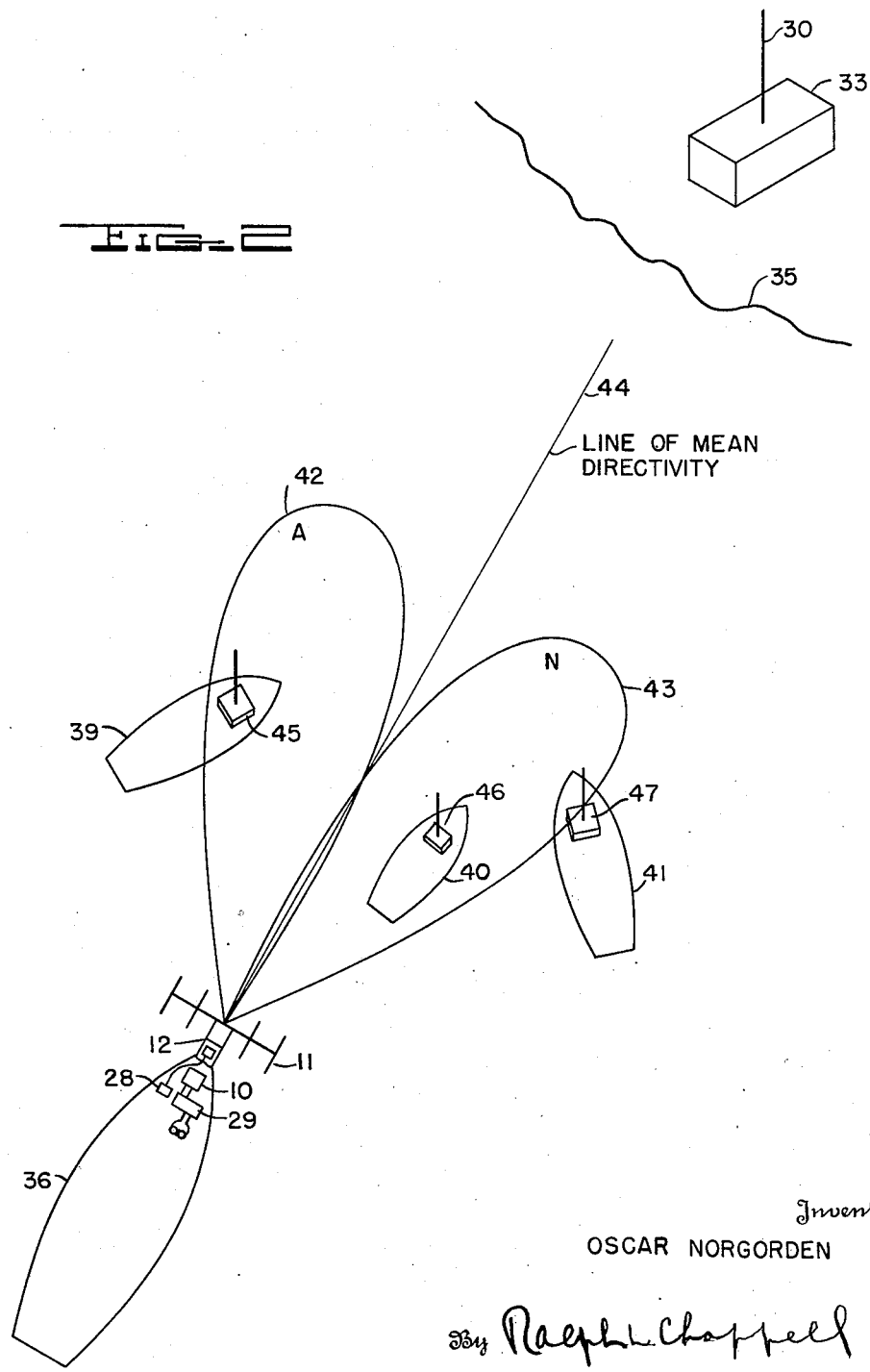

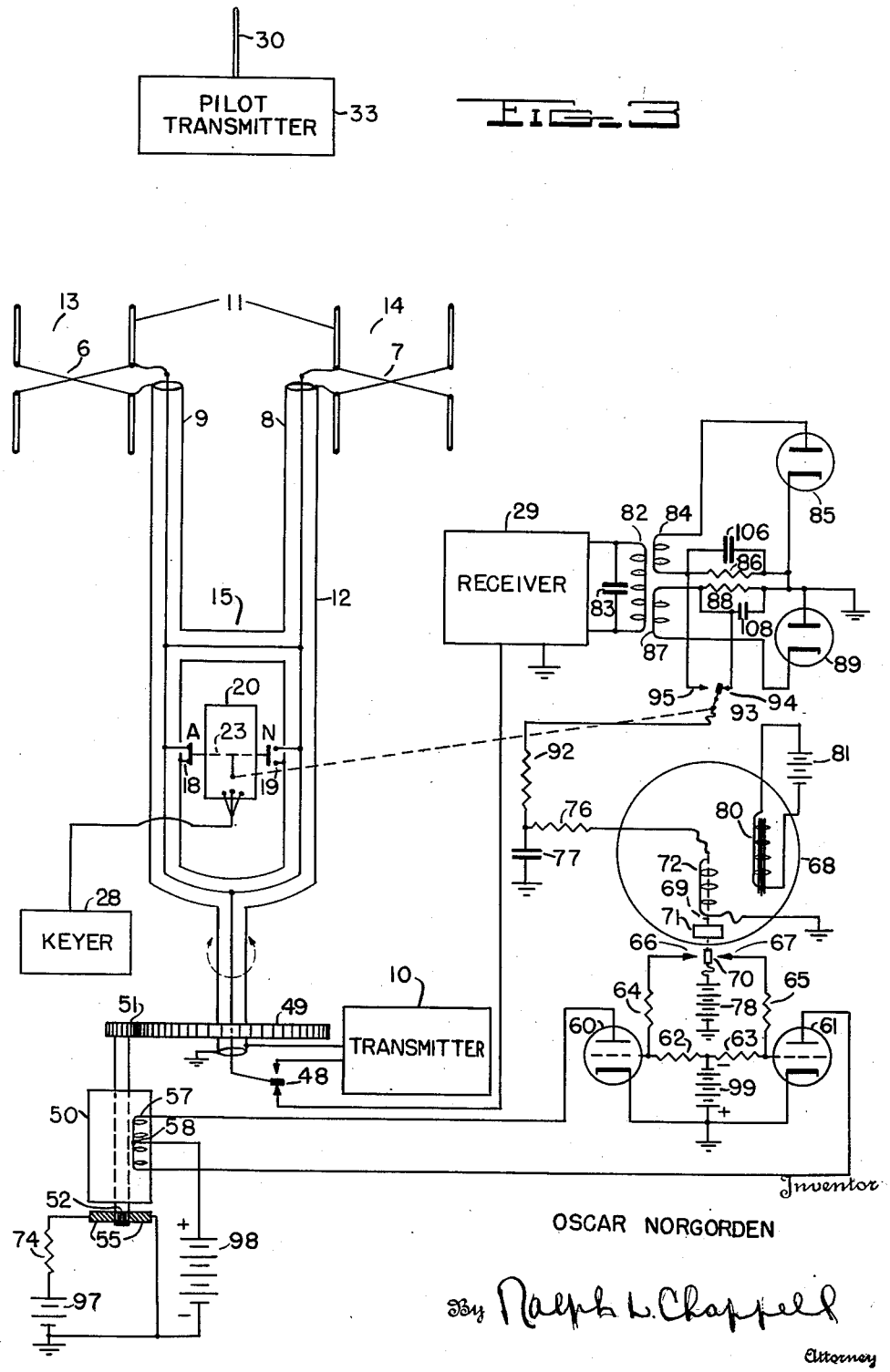

Patented Aug. 19, 1952

2,607,915

UNITED STATES PATENT OFFICE 2,607,915

RADIO BEACON SYSTEM

Oscar Norgorden, Washington, D. C.

Application August 6, 1945, Serial No. 609,312

7 Claims. (Cl. 343—107)

(Granted under the act of March 3, 1883, as amended April 30, 1928; 370 O. G. 757)

This invention relates to radio beacon systems, and is particularly directed to providing a navigation aid for guiding to an objective mobile units, such as a plurality of lighters or other small boats.

One technique heretofore employed for this purpose is to place a pilot transmitter at or very near the objective, and to equip the mobile units with radio direction finding apparatus with the aid of which they can be steered directly to their objective. This plan possesses several disadvantages. It requires that every mobile unit be equipped with a very sensitive and accurate direction-finding apparatus and must carry a skilled operator. Moreover, successful operation of such a system depends absolutely upon the proper functioning of the pilot transmitter; if its signal ceases for any reason the mobile units are left without any radio guidance.

It is an object of this invention to provide a more effective and efficient radio beacon system for guiding mobile units to an objective than is afforded by the prior art.

Another object of this invention is to provide a radio beacon system for guiding a number of units to an objective wherein the individual mobile units need only be equipped with simple receiving apparatus operable by helmsmen or pilots without special training.

Another object of this invention is to provide a lobe-switching radio beacon system employing signals from a remotely located pilot transmitter for periodically reorienting the beacon antenna to insure accuracy of the direction data supplied by the beacon.

The major components of the system embraced by this invention are a beacon transmitter located at a control point, which may be a ship lying off shore, a beacon antenna for the transmitter, lobe-switching and keying apparatus, a receiver located adjacent the beacon transmitter, a pilot transmitter, which may be unattended and of low power, located at or very near the objective to be reached, and a plurality of simple radio receivers, one being located in each lighter or other mobile unit.

The principle of operation is, briefly, that the beacon transmitter at the control point transmits a narrow beam of radio energy directly at the objective, which the mobile units may reach by "riding the beam." The beacon transmitter also transmits, on either side of the true-course beam, coded signals enabling any helmsman or pilot to determine if he is off course to right or left; and periodically the beam antenna used for beacon transmission is switched to a receiver so that signals from a pilot transmitter at or very near the objective may be employed to correct any error in the direction of the beacon beam.

Further description of the invention will be with reference to the drawings, of which:

Fig. 1 is a diagrammatic showing of the principal components of one embodiment of the invention;

Fig. 2 is a diagrammatic plan view of an area comprising a strip of beach with sea adjoining, showing how the embodiment of Fig. 1 would operate to guide a plurality of landing boats to a point on the beach; and Fig. 3 is a drawing, partly diagrammatic and partly schematic, showing another embodiment of the invention.

Referring to Fig. 1, the pilot transmitter located at the objective is represented as block 33, feeding a small, non-directional radiator 30. This transmitter 33 may be of very low power; it transmits a signal continuously. The remainder of the apparatus shown in Fig. 1 is located on the mother ship or control point. Transmitter 10 is of much higher power than pilot transmitter 33, and it operates continuously except when switched off by the operator. The beacon antenna comprises dipole array 11, together with coaxial feed system 12, which is represented in diagrammatic cross-section. The beacon antenna system 11 and 12 is normally connected to the output of transmitter 10 although it may as desired be connected to the input of receiver 29 by means of a transmit-receive switch (not shown) located within the cabinet of transmitter 10.

The components of the antenna assembly 11 and 12 are rigidly supported relative to one another but the entire assembly is rotatably mounted on base 27; pointer 26 and the scale on base 27 diagrammatically represent apparatus by which the angular position of the antenna system may be observed.

Dipole array 11 is made up of the left-hand pair of dipoles 13, fed by coaxial line 9, and the right-hand pair of dipoles 14, fed by coaxial line 8. Each dipole is one-half wavelength long, and the lateral separation of the adjacent dipoles in groups 13 and 14 is one-half wavelength. Transposed transmission line 6 causes the currents in the two dipoles 13 to be in time phase and transposed transmission line 7 causes the current in the two dipoles 14 to be in time phase.

The coaxial feed system 12, shaped like an inverted A, has the function of controlling the time phase of the current in dipoles 13 relative to the current in dipoles 14, so as to produce an overall radiation pattern for the system which can be made to shift from one side to the other of the equi-signal line. The coaxial feed line from transmitter 10 splits into two coaxial lines 9 and 8 at point "O" and they proceed separately to the dipole groups 13 and 14 respectively. At points "G" and "H," a section of coaxial line 15 connects lines 9 and 8 together. At the point A a switch 18 is provided for short-circuiting the conductors of line 9; at the point N switch 19 is provided for short-circuiting the conductors of line 8. The switches 18 and 19 are of the type wherein contactors are shorted by a conducting bar when the switch is closed; the shorting bars of the two switches are connected together by shaft 23 which is of such a length that it is impossible for switches 18 and 19 to be closed simultaneously. Shaft 23 passes through a magnetic control circuit, shown diagrammatically as block 20. The shaft 23 is spring-biased (spring not shown) to keep switch 18 normally closed, but when appropriate current is made to flow through the magnet coils in control circuit 20, the shaft 23 shifts its position laterally so as to open switch 18 and close switch 19. The lengths OA and ON are one-quarter wavelength; likewise the lengths AG and NH are one-quarter wavelength.

The lobe-switching system operates as follows: when switch 18 is closed, the short circuit at A is reflected at O as a very high impedance. In consequence energy from transmitter 10 does not flow up line 9 but proceeds up line 8 to point H. At point H the energy divides evenly, half flowing up line 8 to dipole group 14, the other half going through line 15 and up line 9 to dipole group 13. The energy flows upward at point G instead of downward because the short circuit at A is reflected at point G as a very high impedance. Because the energy must traverse a path to dipoles 13 which is longer by the distance GH than the path taken by the energy flowing to dipoles 14, the current in dipoles 13 lags that in dipoles 14 and in consequence the pattern of radiation from array 11 is a lobe whose maximum lies $\theta$ degrees to the left of the equi-signal line.

When switch 18 is opened and switch 19 is closed, similar phenomena cause the current in dipoles 14 to lag that in dipoles 13, with the result that the lobe of radiation is shifted $\theta$ degrees to the right of the equi-signal line.

If, therefore, the switch shaft 23 be moved systematically from side to side, the lobe of radiation shifts alternately from right to left of center. Systematic movement of shaft 23 is accomplished by magnetic-control circuit 20 in conjunction with keyer 28, shown in block form. Keyer 28 passes through the magnet coils of circuit 20 an intermittent current such that the current flows for three time units, is off for one time unit, on for one time unit, and off for three time units, repeating this code indefinitely at a rate of perhaps ten to twenty times per minute. When the current in circuit 20 is off, switch 18 is closed and switch 19 is open; when the current is on, switch 18 is open and switch 19 is closed. As a result, a listener to signals from transmitter 10 will hear the code letter "A" (dot-dash) when he is situated where signals on the left lobe are received more strongly than signals radiated on the right lobe. A listener in the area wherein signals transmitted on the right lobe are stronger than left lobe signals will hear the code letter "N" (dash-dot). On that line, however, along which signals on both lobes are of equal strength, a listener will not hear a coded signal, but will receive a steady, uninterrupted signal from transmitter 10. This line which will be hereinafter called "line of means directivity," is the "true-course" line along which the beacon system will guide boats or other mobile units.

If everything in the radiating system 11 and 12 were perfectly symmetrical, the line of mean directivity would lie along a line normal to the plane of the dipole array 11. Hence if perfect symmetry were assured, the system need merely be rotated until that line of mean directivity line pointed in the direction of the objective and operations could proceed with assurance that the radio beacon was directing the mobile units directly to their objective. In practice, however, no assurance exists that the line of mean directivity lies along the normal line; numerous factors can produce sufficient asymmetry to divert it by many degrees of arc. Reflections from nearby objects such as a ship's superstructure, variations in the contact resistance of the shorting switches 18 and 19, and changes in antenna characteristics owing to ice or water are among the factors which may be responsible for shifting the line of mean directivity away from the normal line. Moreover, movement of the ship carrying the beacon may shift the line from its proper position. In an operation of the sort which this invention is designed to assist, it is of course vitally important that error in the beacon's orientation be eliminated. In this invention that can be accomplished by use of the pilot transmitter 33 in conjunction with receiver 29.

Receiver 29 may be connected to the terminals of antenna system 11 and 12 by means of a transmit-receive switch (not shown) as heretofore stated. When this is done, the receiver may be tuned to intercept the signals of pilot transmitter 33. Since the directive characteristics of the antenna system are identical for both transmitting and receiving, the signals produced in headphones 24 coupled to the output of receiver 29 will be modulated by the lobe-switching action. Hence, the signals from transmitter 33 will be heard as code letters "A" or "N" unless the orientation of the system 11 and 12 is such as to place transmitter 33 on the line of mean directivity of the array. To be sure, therefore, that the system is guiding the mobile units properly, it is merely necessary to switch the antenna system to receive 29 at intervals, turn off transmitter 10, and listen to the signal from transmitter 33. If it is heard as a continuous signal, the orientation of the beacon antenna is correct If a code letter A or N is heard, it is an indication the line of mean directivity is to the right or left of the objective and the system can be rotated in the appropriate direction until a continuous signal is restored.

Fig. 2 illustrates by a digrammatic plan view how the system might be employed in a landing operation. The drawing represents a strip of beach 35 with the sea adjacent thereto; pilot transmitter 33 is shown on the beach- it may in practice be there or floating in the water near the beach. Transmitter 10, receiver 29, keyer 28, and antenna system 11 and 12 are represented as mounted on a ship 36, which is lying out to sea from the beach 35. The left and right lobes of the radiation pattern from array 11 are shown, numbered 42 and 43 respectively. The line of mean directivity 44 is shown pointing directly to antenna 30 of pilot transmitter 33, as it should if the beacon system is properly operated. Boats 39, 40 and 41 are shown en route to the beach 35. On each boat a simple radio receiver is shown in block form, the receivers being numbered 45, 46, and 47 for boats 39, 40 and 41 respectively. These receivers are tuned to the frequency of transmitter 10 and may feed headphones (not shown) worn by the coxswains of the boats. No particular operating skill is required of the coxswains; they are informed by the character of the signal heard in the phones whether they are on course, or off to the left or right. In the drawing, the coxswain of boat 39 would hear the code letter "A" in his phones, warning him that he is to the left of true course and must steer to the right. Boats 40 and 41, on the other hand, are to the right of true course, and their coxswains will be so informed by hearing the code letter "N"—a signal to steer to the left. Any boat which is on or very near the line of mean directivity will hear a steady signal, which will indicate that he is on the line between the ship and the objective.

In the embodiment of the invention just described, means are provided for determining whether the beacon antenna's line of mean directivity is lying along the line to the objective, and the direction of rotation necessary to correct any error is indicated, but actual rotation of the beacon antenna to the correct position must be effected by the operator. Fig. 3 shows, in diagrammatic and schematic form, an embodiment of the invention in which the beacon antenna is automatically maintained at the position wherein the line of mean directivity lies on the direct line to the objective.

Most of the components of Fig. 1 appear again in the embodiment of Fig. 3, and they retain the same designating numerals as on Fig. 1. Pilot transmitter 33 with its antenna 30 is shown, and array 11, coaxial feed and lobe switching system 12, and keyer 28 appear in Fig. 3 also. Coaxial feed system 12 and array 11 are rotatably mounted at the base of system 12, as in Fig. 1, but in Fig. 3, gear 49 is concentrically mounted on coaxial feed system 12 near its base and is meshed with smaller gear 51, which is concentrically mounted on the shaft of D.-C. motor 50. Motor 50 is represented diagrammatically; its commutator 52 is shown at the opposite end of the shaft from gear 51, and armature brushes 55 are shown in rubbing contact with commutator 52. Field coil 57 is shown schematically; it is center-tapped; the center tap is designated 58. D.-C. source 97 is connected across armature brushes 55 in series with current-limiting resistor 74. Center tap 58 of field coil 57 is connected to the positive side of D.-C. source 98; the negative sides of sources 97 and 98 are grounded. One end of field coil 57 is connected to the plate of tube 60; the other end is connected to the plate of tube 61. The cathodes of tubes 60 and 61 are grounded. The positive side of D.-C. source 99 is grounded; its negative side is connected to the grid of tube 60 through resistor 62 and to the grid of tube 61 through resistor 63.

A transmit-receive switch 48 provides a means of switching antenna system 11 and 12 from the output of transmitter 10 to the input of receiver 29, and vice versa. Switch 48 and an off-on switch for transmitter 10 are operated in unison by clock work mechanism (not shown) so adjusted that for substantial time intervals (perhaps four minutes) transmitter 10 is on and the antenna system is connected to the transmitter, and for shorter intervening intervals (perhaps one minute) the transmitter is off and the antenna system is connected to receiver 29.

Receiver 29, shown in block form, comprises a high-gain amplifier feeding into the resonant circuit consisting of condenser 83 and coil 82. Identical coils 84 and 87 are inductively coupled to coil 82, the degrees of coupling being equal. One side of coil 84 is connected to the plate of diode tube 85; the other side of coil 84 is connected to the cathode of diode 85 through load resistor 86 and condenser 106 in parallel. One side of coil 87 is connected to the cathode of diode tube 89, which is identical in characteristics with diode 85; the other side of coil 87 is connected to the plate of diode 89 through the parallel combination of resistor 88 and condenser 108. The cathode of diode 85 and the plate of diode 89 are grounded. Resistors 86 and 88 are identical; condensers 106 and 108 are identical.

A single-pole double-throw switch comprising arm 93 and electrodes 94 and 95 is mechanically ganged to shaft 23 in the lobe switching assembly so that when switch 18 is closed, arm 93 is in contact with electrode 94 and when switch 19 is closed, arm 93 is in contact with electrode 95. Electrode 94 is connected to the ungrounded end of resistor 88; electrode 95 is connected to the ungrounded end of resistor 86. Switch arm 93 is connected through resistor 92 to one side of condenser 77. The other side of condenser 77 is grounded.

A sensitive magnetic relay 68 is shown schematically. It comprises a field coil 80 connected across D.-C. source 81, and a movable component mounted rotatably within the magnetic field of coil 80. The movable component comprises a switch arm 69 having damper weight 71 and contactor 70 mounted thereon. Coil 72 is wound around switch arm 69 but is insulated therefrom. One terminal of coil 72 is connected, by a flexible connector, to ground. The other terminal of coil 72 is connected, by a flexible connector, to one side of resistor 76. The other side of resistor 76 is connected to the junction of resistor 92 and condenser 77. Contactor 70 is connected to the positive terminal of D.-C. source 78; the negative terminal of source 78 is grounded. Mounted on opposite sides of contactor 70 in the plane of rotation of switch arm 69 are contactors 66 and 67. Arm 69 is spring-biased (spring not shown) to a rest position midway between contactors 66 and 67, so that contactor 70 does not touch either unless a current is flowing through coil 72. The flow of current through coil 72 will result in rotation of switch arm 69 in one direction or the other, however, with consequent contact between contactor 70 and contactor 66 or 67, depending on the direction of current flow in coil 72. Contactor 66 is connected through resistor 64 to the grid of tube 60; contactor 67 is connected through resistor 65 to the grid of tube 61.

The operation of the automatic antenna training system shown in Fig. 3 is as follows: assuming at first that the antenna is properly trained, when the switch 48 throws the antenna system over to receiver 29, the signals from pilot transmitter 33 will be received with equal strength on both lobes. Hence the developed voltage across load resistors 86 and 88 will be constant and equal in magnitude, although, owing to the direction of the flow of rectified current in each case, the voltage at the ungrounded end of resistor 86 will be negative relative to ground, whereas the voltage at the ungrounded end of resistor 88 will be positive. Switch arm 93, moving in synchronism with the lobing switch arm 23, will divide time equally between contactors 95 and 94; accordingly, the voltage at switch arm 93 will be alternately positive and negative, with average value zero. Resistor 92 and condenser 77 form an integrating circuit, and the condenser 77 will charge to the average value of the voltage at arm 93, which is zero in the present case. Since the charge on condenser 77 is zero, no current will flow through resistor 76 and coil 72. Since coil 72 is not energized, switch arm 69 will hold its rest position with contactor 70 touching neither contactor 66 or 67. Therefore the voltage at the grids of tubes 60 and 61 will be equal to the voltage of D.-C. source 99, which is sufficiently negative to bias both tubes below cutoff. Since neither tube will conduct, no current will flow in either portion of field coil 57 and motor 50 therefore will not rotate. Hence, so long as the antenna system is properly trained, the training control system is quiescent.

Now suppose the antenna system is not properly trained and, when a receiving interval is reached, signals from pilot transmitter 33 are received more strongly on the left lobe than on the right. In that case the voltage across load resistors 86 and 88 is no longer constant, but is greater when the antenna is throwing its beam to the left. When the antenna is on the left lobe, that is, when switch 18 is closed, switch arm 93 is contacting electrode 94 and is therefore at a positive potential. When switch 19 is closed, arm 93 contacts electrode 95, and the arm 93 is hence at a negative potential smaller in magnitude than the positive potential derived from electrode 94. The result is a varying voltage at switch arm 93 which has a positive average value. Condenser 77 charges to this average value and a discharge current flows through resistor 76 and coil 72 to ground. The magnetic field around coil 72 interacts with the field of coil 80 and causes rotation of arm 69, bringing contactor 70 into contact with either contactor 66 or 67. This impresses the D.-C. potential source 78 on to the grid circuit of either tube 60 or tube 61 and causes the grid voltage of that tube to rise, thereby causing plate current to flow therein. The plate current flows through half of field winding 57 of motor 50 and by energizing the field, causes the motor and the antenna system to rotate. The rotation should of course be in that direction which will reduce the training error to zero. If the rotation is in the opposite direction, the condition can be corrected by reversing the connections to D.-C. source 97, which energizes the motor armature.

A training error in the opposite direction will produce a similar reaction except that the voltage developed across condenser 77 will be negative relative to ground, the current in coil 72 will reverse, switch arm 69 will swing in the opposite direction, applying the voltage from source 78 to the grid of the other tube, the other tube will be caused to conduct, the plate current will flow in the other half of field winding 57 of motor 50, and the motor's rotation will be in the reverse direction, thus again rotating the antenna system and reducing the training error to zero.

In summary, the system checks on the antenna training at each receiving period, that is, at each time switch 48 connects the antenna system to receiver 29, and if any training error exists, be it the result of change in antenna characteristics or shift in position of the ship carrying the beacon system, the automatic training control apparatus causes the motor 50 to rotate the antenna and restore proper training before transmissions from transmitter 10 are resumed.

It will be understood that the embodiments of the invention herein shown and described are exemplary only, and that the scope of the invention is to be determined from the appended claims.

The invention described herein may be manufactured and used by or for the Government of the United States of America for governmental purposes without the payment of any royalties thereon or therefor.

What is claimed is:

1. In combination, a radio beacon transmitter, a receiver, and a directional antenna whose directional characteristics are periodically shifted with time between two beam positions all at one location, a pilot transmitter situated at a point remote from said radio beacon transmitter location, switching means operable to switch the antenna between said beacon transmitter and said receiver, means operable to orient the antenna toward the pilot transmitter in response to signals received therefrom when said antenna is connected to said receiver, and means operable to transmit beacon signals from said antenna when said antenna is connected to said beacon transmitter.

2. In combination, a radio beacon transmitter, a receiver, and a directional antenna whose directional characteristics are periodically shifted with time between two beam positions all at one location, a pilot transmitter situated at a point remote from said radio beacon transmitter location, switching means operable to switch the antenna between said beacon transmitter and said receiver, means operable to orient the antenna toward the pilot transmitter in response to signals received therefrom when said antenna is connected to said receiver, and means operable in conjunction with the periodic shifting of the directional characteristics of said antenna to transmit beacon signals from said antenna when said antenna is connected to said beacon transmitter.

3. In combination, a radio beacon transmitter, a receiver and a directional antenna having dual lobe switching means all at one location, a pilot transmitter situated at a point remote from said radio beacon transmitter location, switching means operable to switch the antenna system between said beacon transmitter and said receiver, means responsive to signals received from said pilot transmitter by said receiver operable to orient the antenna system so as to receive signals from the pilot transmitted with equal intensity on each position of the lobe switching means when said antenna is connected to said receiver, and means operable to transmit beacon signals when said antenna is connected to said radio beacon transmitter.

4. In combination, a radio beacon transmitter, a receiver and a directional antenna having dual lobe switching means all at one location, a pilot transmitter situated at a point remote from said radio beacon transmitter location, switching means operable to switch the antenna system between said beacon transmitter and said receiver, means responsive to signals received from said pilot transmitter by said receiver operable to orient the antenna system so as to receive signals from the pilot transmitter with equal intensity on each position of the lobe switching means when said antenna is connected to said receiver, and means operable in conjunction with said lobe switching means to transmit beacon signals when said antenna is connected to said radio beacon transmitter.

5. In combination, a radio beacon transmitter, a receiver and a directional antenna system having dual lobe switching means all at one location, a pilot transmitter situated at a point remote from said radio beacon transmitter location, switching means operable to switch the antenna system between the beacon transmitter and receiver, means coupled to the receiver operative to detect the relative intensity of signals from the pilot transmitter as received on each position of the lobe-switching means, means operative responsively to the detecting means to orient the antenna system so as to effect reception of signals from the pilot transmitter with equal intensity on each switch position of the lobe-switching means, and means operable to transmit beacon signals when said antenna is connected to said beacon transmitter.

6. In combination, a radio beacon transmitter, a receiver, and a directional antenna system having dual lobe switching means all at one location, a pilot transmitter located at a point remote from the radio beacon transmitter location, switching means operative to switch the antenna system between the beacon transmitter and receiver, means responsive to signals received from said pilot transmitter when said antenna is connected to said receiver to orient the antenna so as to receive signals from the pilot transmitter with equal intensity on each switch position of the lobe switching means, means operable to transmit beacon signals when said antenna is connected to said radio beacon transmitter, and a mobile unit having a radio receiver receptive to signals from the beacon transmitter as radiated by the antenna system.

7. In combination, a radio beacon transmitter, a receiver and a directional antenna having a unidirectional antenna pattern all at one location, a pilot transmitter located at a point remote from the radio beacon transmitter location, first switching means for periodically switching the axis of said pattern alternately between two opposing positions slightly divergent from a mean line of directivity, second switching means operable to switch the antenna system between said beacon transmitter and said receiver, means responsive to signals received by said receiver from said pilot transmitter to orient the antenna toward the pilot transmitter when said receiver is connected to said antenna, and means operable to transmit beacon signals when said antenna is connected to said beacon transmitter.

OSCAR NORGORDEN.

REFERENCES CITED

The following references are of record in the file of this patent:

UNITED STATES PATENTS

| Number | Name | Date |
| --- | --- | --- |
| 2,132,599 | Baumann et al. | Oct. 11, 1938 |
| 2,152,329 | Schussler | Mar. 28, 1939 |
| 2,234,244 | Gossel | Mar. 11, 1941 |
| 2,241,924 | Robb et al. | May 13, 1941 |
| 2,257,319 | Williams | Sept. 30, 1941 |
| 2,321,698 | Nolde | June 15, 1943 |
| 2,401,759 | Hersey | June 11, 1946 |
| 2,433,381 | Marchand | Dec. 30, 1946 |